United States Patent
Fujita

(10) Patent No.: US 7,924,324 B2
(45) Date of Patent: Apr. 12, 2011

(54) SOUND-CONTROLLED ELECTRONIC APPARATUS

(75) Inventor: Takashi Fujita, Takarazuka (JP)

(73) Assignee: Sanyo Electric Co., Ltd., Moriguchi-shi, Osaka (JP)

(*) Notice: Subject to any disclaimer, the term of this patent is extended or adjusted under 35 U.S.C. 154(b) by 479 days.

(21) Appl. No.: 10/577,999

(22) PCT Filed: Oct. 29, 2004

(86) PCT No.: PCT/JP2004/016489
§ 371 (c)(1),
(2), (4) Date: May 3, 2006

(87) PCT Pub. No.: WO2005/045807
PCT Pub. Date: May 19, 2005

(65) Prior Publication Data
US 2007/0107980 A1    May 17, 2007

(30) Foreign Application Priority Data
Nov. 5, 2003 (JP) .................. 2003-376060

(51) Int. Cl.
H04N 5/232 (2006.01)
H04N 5/76 (2006.01)
G10L 15/00 (2006.01)
(52) U.S. Cl. .................. 348/231.4; 704/246; 348/211.9
(58) Field of Classification Search ............ 348/207.99, 348/211.99, 211.9, 222.1, 231.4; 704/246
See application file for complete search history.

(56) References Cited

U.S. PATENT DOCUMENTS
2004/0044428 A1* 3/2004 Yoshino .................. 700/94

FOREIGN PATENT DOCUMENTS

| | | |
|---|---|---|
| JP | S59-103101 U | 7/1984 |
| JP | 61-173374 A | 8/1986 |
| JP | 63-163498 A | 7/1988 |
| JP | 2-146600 | 6/1990 |
| JP | 02146600 A * | 6/1990 |
| JP | 2-232697 | 9/1990 |
| JP | 2-254499 | 10/1990 |
| JP | 4-299410 | 10/1992 |
| JP | 9-149157 | 6/1997 |
| JP | 09149157 A * | 6/1997 |
| JP | 9-204290 | 8/1997 |
| JP | 11-109498 A | 4/1999 |
| JP | 2000-78448 A | 3/2000 |
| JP | 2000-155595 | 6/2000 |
| JP | 2000-200095 | 7/2000 |

(Continued)

OTHER PUBLICATIONS

International Search Report of PCT/JP2004/016489 date of mailing Feb. 15, 2005.

(Continued)

*Primary Examiner* — Timothy J Henn
(74) *Attorney, Agent, or Firm* — Westerman, Hattori, Daniels & Adrian, LLP

(57) ABSTRACT

An electronic apparatus (102) includes a microphone (40). Sound is captured by the microphone (40), and a key operation is detected by a sub microcomputer (46). The processes according to outputs from the microphone (40) and the sub microcomputer (46) are executed by a main microcomputer (42). The main microcomputer (42) outputs a sound effect from a speaker (58) in response to the key operation. Besides, output setting of the sound effect is changed between active state and inactive state. The main microcomputer (42) changes an extraction characteristic of sound according to the setting state of sound effect output.

8 Claims, 8 Drawing Sheets

FOREIGN PATENT DOCUMENTS

| | | |
|---|---|---|
| JP | 2001-142485 A | 5/2001 |
| JP | 2001-167662 A | 6/2001 |
| JP | 2001-184085 A | 7/2001 |
| JP | 2002-318597 | 10/2002 |
| JP | 2003-114697 | 4/2003 |
| JP | 2003114697 A * | 4/2003 |
| JP | 2003-295899 | 10/2003 |

OTHER PUBLICATIONS

Office Action issued Oct. 20, 2009 in corresponding Japanese Patent Application 2005-515327.

Office Action issued Feb. 2, 2010 in co-pending Japanese Patent Application 2005-515327.

* cited by examiner

SOUND-CONTROLLED ELECTRONIC APPARATUS

TECHNICAL FIELD

The present invention relates to sound-controlled electronic apparatus. More specifically, the present invention relates to video cameras and digital still cameras that detect sound and control photographing.

PRIOR ART

One example of this kind of conventional video camera is disclosed in Japanese Patent Laying-open No. 2000-155595 laid-open on Jun. 6, 2000. This prior art comprises an input means for inputting an audio signal, a voice recognition means for recognizing the input audio signal, and a control means for controlling the operation of the apparatus in accordance with the recognized audio signal, and controls by sound the features of the camera such as lens opening, shutter speed and operation mode.

In the prior art, however, even if no human voice is input into the camera, the camera may function incorrectly due to mechanical sounds made through operation with a button of the camera and sound effects produced by the camera itself. This prior art has no high possibility of such malfunction because it comprises the voice recognition means for settings of various features. However, if the recognition characteristics of the voice recognition means are not sufficient or if the camera features are set by detection of loudness or frequency of voice, instead of by voice recognition, there is an increased possibility that a malfunction may occur.

SUMMARY OF THE INVENTION

Therefore, it is a primary object of the present invention to provide a novel electronic apparatus.

It is another object of the present invention to provide electronic apparatus that makes it possible to prevent a malfunction resulting from a sound made by operation with a button of the electronic apparatus itself.

An electronic apparatus of claim 1 comprises a first detection means for detecting a sound, a second detection means for detecting a key operation, a first process means for executing a process corresponding to output from the first detection means, a second process means for executing a process corresponding to output from the second detection means, and a restriction means for restricting a processing operation of the first process means for a predetermined period of time from the key operation based on the output from the second detection means.

Sound is detected by the first detection means, and key operation is detected by the second detection means. A process according to the output from the first detection means is executed by the first process means, and a process according to the output from the second process means is carried out by the second process means. The restriction means restricts the processing operation of the first process means for a predetermined period of time from the key operation based on the output from the second detection means. With this, the processing operation of the first process means is restricted on the basis of a sound generated by the key operation. That is, it is possible to prevent a malfunction that may result from the sound of key operation.

An electronic apparatus of claim 2 further comprises a sound effect output means for outputting a sound effect in response to the key operation.

An electronic apparatus of claim 3 depends on claim 1, and the restriction means includes a characteristic change means for changing a detection characteristic of the first detection means.

An electronic apparatus of claim 4 depends on claim 3, and the first detection means includes a capture means for capturing a sound and an extraction means for extracting a predetermined frequency component of the sound captured by the capture means, and the characteristic change means changes a frequency characteristic of the extraction means.

An electronic apparatus of claim 5 comprises a first detection means for detecting a sound, a second detection means for detecting a key operation, a first process means for executing a process corresponding to output from the first detection means, a second process means for executing a process corresponding to output from the second detection means, a sound effect output means for outputting a sound effect in response to the key operation, a first change means for changing a setting state of the sound effect output means between an active state and an inactive state, and a second change means for changing a detection characteristic of the first detection means according to the setting state of the sound effect output means.

Sound is detected by the first detection means, and key operation is detected by the second detection means. A process according to the output from the first detection means is executed by the first process means, and a process according to the output from the second process means is carried out by the second process means. The sound effect output means outputs a sound effect in response to the key operation. The setting state of the sound effect output means is changed by the first change means between active state and inactive state. The second change means changes the detection characteristic of the first detection means according to the setting state of the sound effect output means. This makes it possible to prevent a malfunction of the first process means resulting from the sound effect.

An electronic apparatus of claim 6 depends on claim 5, and the first detection means includes a capture means for capturing a sound and an extraction means for extracting a predetermined frequency component of the sound captured by the capture means, and the second change means changes a frequency characteristic of the extraction means.

An electronic apparatus of claim 7 comprises a first detection means for detecting a sound, a second detection means for detecting a key operation, a first process means for executing a process corresponding to output from the first detection means, a second process means for executing a process corresponding to output from the second detection means, a sound effect output means for outputting a sound effect in response to the key operation, a first change means for changing a setting state of the first process means between an active state and an inactive state, and a second change means for changing an output characteristic of the sound effect output means according to the setting state of the first process means.

Sound is detected by the first detection means, and key operation is detected by the second detection means. A process according to the output from the first detection means is executed by the first process means, and a process according to the output from the second process means is carried out by the second process means. The sound effect output means outputs a sound effect in response to the key operation. The setting state of the first process means is changed by the first change means between active state and inactive state. The second change means changes the output characteristic of the sound effect output means according to the setting state of the first process means. By changing the output characteristic of a sound effect, it is possible to prevent a malfunction of the first process means resulting from the sound effect.

An electronic apparatus of claim 8 depends on claim 7, and the second change means changes a frequency characteristic of a sound effect.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
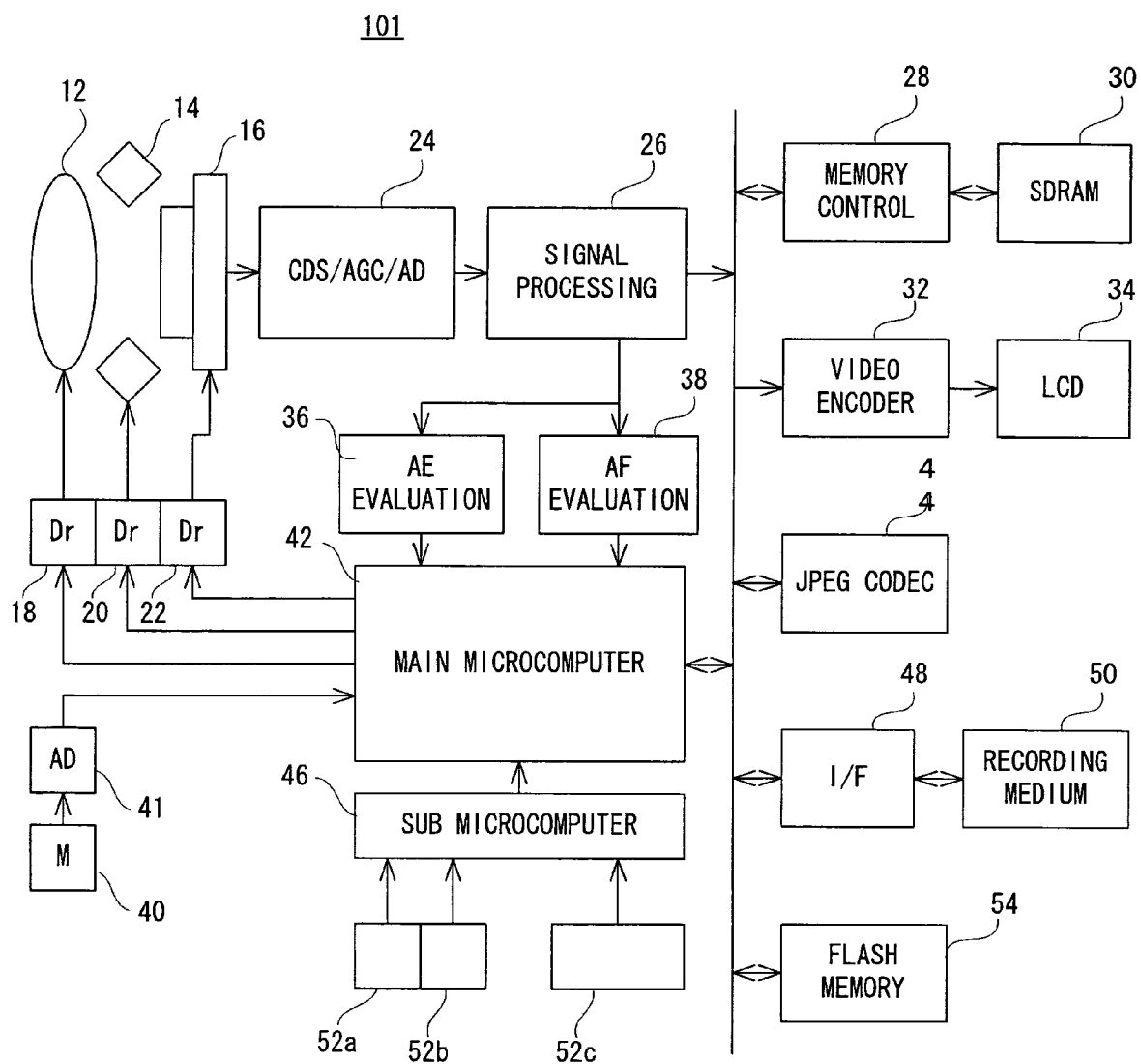
FIG. 1 is a functional block diagram showing a first embodiment of the present invention.

Referring to FIG. 1, a digital still camera 101 of this embodiment includes a focus lens 12 and an aperture unit 14. Through these members, an optical image of an object scene is irradiated onto a light-receiving surface, i.e., an imaging surface of an image sensor 16. On the imaging surface, an electric charge, that is, a raw image signal corresponding to the optical image of the object scene is generated by photoelectric conversion.

In executing a through image processing, i.e., a process of displaying a real-time moving image of the object scene on an LCD monitor 34, a main microcomputer 42 instructs a driver 20 to open the aperture and instructs a driver 22 to repeat preexposure and thinned-out reading. The driver 20 opens the aperture unit 14, and the driver 22 executes repeatedly preexposure of the image sensor 16 and thinned-out reading of the resulting raw image signal. The preexposure and thinned-out reading are carried out in response to a vertical synchronizing signal generated every 1/30 second. With this, low-resolution raw image signals according to the optical image of the object scene are output from the image sensor 16 at a frame rate of 30 fps.

The output raw image signal of each frame is subjected by a CDS/AGC/AD circuit 24 to a series of processes of noise removal, level adjustment and A/D conversion, thereby acquiring raw image data as a digital signal. The signal processing circuit 26 subjects the raw image data output from the CDS/AGC/AD circuit 24 to such processes as white balance adjustment, color separation and YUV conversion to generate image data in YUV format. The generated image data is written by a memory control circuit 28 into an SDRAM 30, and then read by the same memory control circuit 28 later on. A video encoder 32 converts the image data read by the memory control circuit 28 into a composite video signal in NTSC format, and provides the converted composite video signal to the LCD monitor 34. As a result, a through image of the object scene is displayed on the monitor screen.

In a normal photographing mode, when a shutter button 52a is partly pressed, a sub microcomputer 48 detects a partial press of the shutter button 52a as event information, and informs the main microcomputer 42 of the detection result. The main microcomputer 42 executes an AE process and an AF process preparatory to image recording.

The AE process is carried out according to a procedure described below. Out of the image data generated by the signal processing circuit 26, Y data is provided to an AE evaluation circuit 36. The AE evaluation circuit 36 assigns a plurality of photometer areas on the screen, and integrates Y data belonging to the individual photometer areas at each period of one frame. The main microcomputer 42 fetches a plurality of luminance evaluation values (integrated values) individually determined in the plurality of photometer areas, and adjusts a preexposure time and an amount of aperture of the aperture unit 14 set in the driver 22, based on those luminance evaluation values.

The AF process is carried out according to a procedure described below. In an AF evaluation circuit 38, high frequency components of the Y data generated by the signal processing circuit 26 are integrated at each period of one frame. With this, an AF evaluation value (degree of focus) is determined at a rate of once per frame. Then, the main microcomputer 42 captures the AF evaluation value output from the AF evaluation circuit 38 in response to the vertical synchronizing signal, and drives the driver 18 in such a manner that the AF evaluation value becomes maximum, as a so-called hill-climbing AF mode control, to move the position of a focus lens 12 in a direction of optical axis. Accordingly, the focus lens 12 is set to a focal point.

When the shutter button 52a is wholly pressed, the sub microcomputer 46 notifies that to the main microcomputer 42, and the main microcomputer 42 executes an image recording process. The main microcomputer 42 firstly instructs the driver 22 to perform main exposure and all-pixel reading. The driver 22 performs main exposure in the image sensor 16 and reads all the pixels of a resulting raw image signal once each. With this, a high-resolution raw image signal corresponding to an optical image of the object scene is output from the image sensor 16 at a frame rate of 30 fps. The output raw image signal is converted by the same process as descried above into image data in YUV format, and the converted image data is written by the memory control circuit 28 into the SDRAM 30.

The main microcomputer 42 issues an instruction for image compression to the JPEG codec 44. The JPEG codec 44 reads one frame of image data from the SDRAM 30 through the memory control circuit 28, subjects the read image data to JPEG compression, and then writes the compressed image data, i.e., JPEG data into the SDRAM 30 through the memory control circuit 28. The main microcomputer 42 further reads the JPEG data sequentially from the SDRAM 30 through the memory control circuit 28, and records image files containing the read JPEG data in the recording medium 50 through the I/F circuit 48. Upon completion of this image recording process, the above mentioned through image processing is started again.

The microphone 40 is a sensor for detecting a sound, and its output is input into the main microcomputer 42 via the A/D conversion circuit 41. Also, a sound control mode setting button 52b is an operating button for giving an instruction for switching between a normal photographing mode and a sound control mode in which photographing start is under sound control, and an operating button group 52c is a single or a plurality of operating buttons for giving a digital still camera 10 an instruction for carrying out various settings and operations, for example, on/off switching of the LCD monitor 34 and characteristic switching of white balance adjustment.

Figure 2:
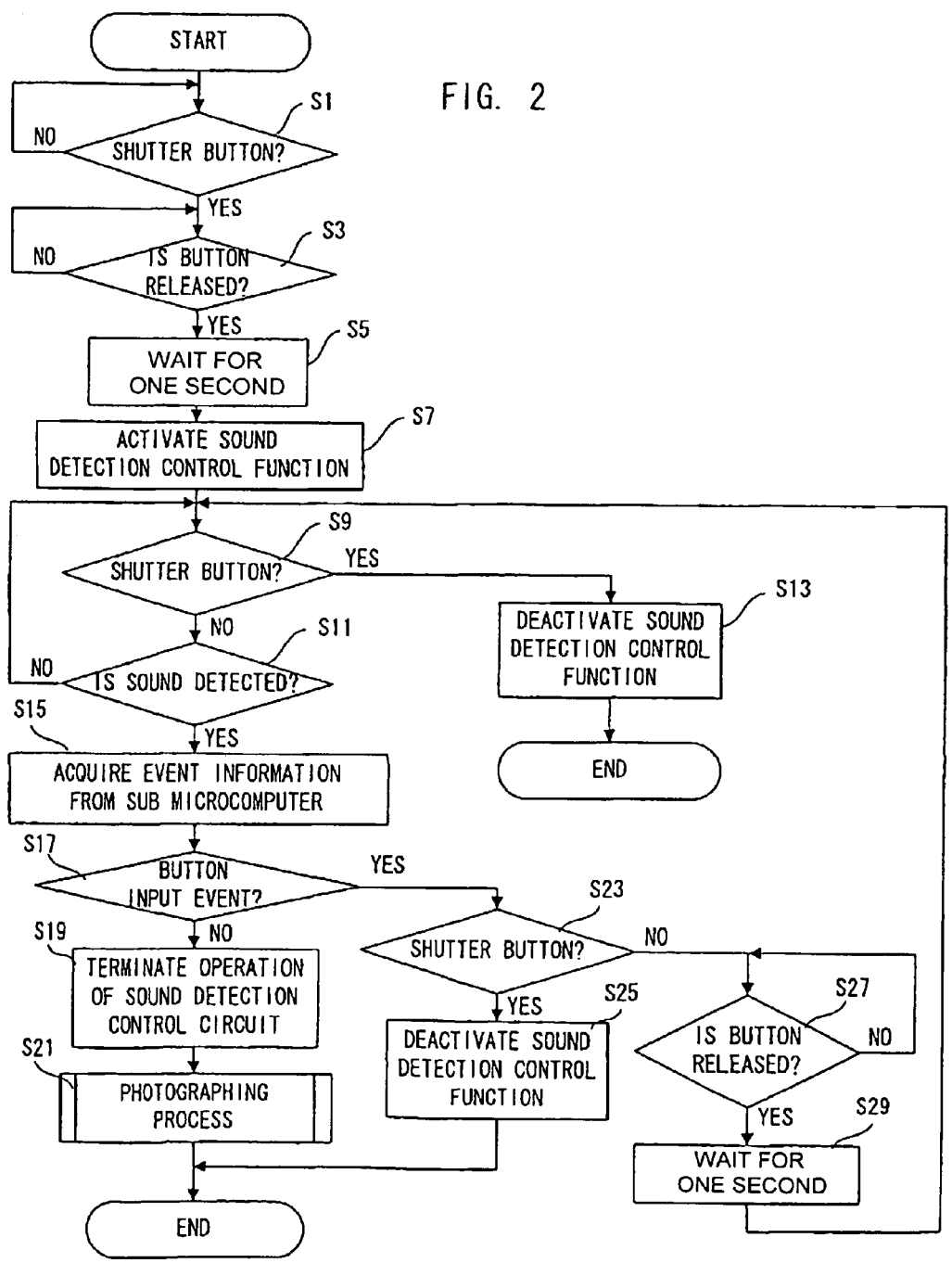
FIG. 2 is a flowchart showing a part of operation of the first embodiment of the present invention.

Next, when the sound control mode setting button 52*b* is operated and the digital still camera 10 is set in the sound control mode, the main microcomputer 42 executes a process according to a flowchart shown in FIG. 2. The control program in the normal photographing mode and the control program corresponding to the flowchart are stored in the flash memory 54.

The operation of the main microcomputer 42 is described with reference to FIG. 2. When the sound control mode setting button 52*b* is operated and the digital still camera 101 is set in the sound control mode, the press of the shutter button 52*a* is firstly detected and then the release of the button is detected on the basis of information from the sub microcomputer 46 (S1, S3). When the release of the button has been detected, after a waiting time of one second, sound detection function of the main microcomputer 42 is activated to start the detection of a sound input from the microphone 40 (S5, S7). Waiting for one second in a step S5 is intended to prevent the main microcomputer 42 from detecting the sound of press of the shutter button 52*a* by its sound detection function and causing a malfunction due to that. The waiting time is a time between the instant when the shutter button 52*a* was pressed and the instant when sound of press of the shutter button 52*a* has exerted no effect on operation, and is set as appropriate according to the structural features of the digital still camera 101 including the shape of the shutter button 52*a* and the attachment position of the microphone 40, etc.

After the activation of the sound detection function of the main microcomputer 42 in a step S7, it is detected whether the shutter button 52*a* is pressed or not (S9) and whether or not the sound input from the microphone 40 is a sound at a predetermined or higher level (S11). The sound detection in the step S11 is not limited to human voice and applies to any sounds capable of being detected by the microphone 40 such as a note of a flute and a clap of hands.

Upon detection of press of the shutter button 52*a* in the step S9, the sound detection function of the main microcomputer 42 is deactivated to terminate the sound control mode (S13). If no sound at a predetermined or higher level is detected in the step S11, the process is returned to the earlier stage of step S9. Thus, if neither any press of the shutter button 52*a* is detected nor any sound at a predetermined or higher level is detected, the steps S9 and S11 are repeatedly carried out.

When a sound at a predetermined or higher level is detected in the step S11, event information is acquired from the sub microcomputer 46 (S15), and it is detected whether or not there is a button input event indicating the presence of button operation (S17). If it is detected that there is no button input event, the sound detection function of the main microcomputer 42 is deactivated (S19), a photographing process is carried out (S21) and the sound control mode is terminated. That is, in this embodiment, the sound control mode is terminated at each execution of the photographing process. The photographing process of step S21 is a combination of pre-processing of image recording process and the image recording process in the normal photographing mode.

When the presence of a button input event is detected in the step S17, if the event is generated by operation of the shutter button 52*a*, the sound detection function of the main microcomputer 42 is deactivated and the sound control mode is terminated (S23, S25). If it is detected in the step S23 that the button input event is generated not by operation of the shutter button 52*a* but by operation of another button, it is detected that the button associated with the generation of the button input event is released on the basis of information from the sub microcomputer 46, and after a waiting time of one second, the process is returned to the earlier stage of step S9. That is, once the sound detection function of the main microcomputer 42 is activated in the step S7, it is impossible to perform any operations or settings by any operating buttons other than the shutter button 52*a*.

The waiting time in a step S29 is a time between the instant when an operating button other than the shutter button 52*a* was used and the instant when a sound generated in using the button has exerted no effect on operation, and is set as appropriate according to the structural features of the digital still camera 101 including the shape of the shutter button 52*a* and the attachment position of the microphone 40, etc.

In this embodiment, the use of an operating button is detected and then the sound detection function is deactivated for a predetermined time after a predetermined waiting time. This makes it possible to prevent a malfunction that may occur due to a sound generated in using the operating button.

Figure 3:
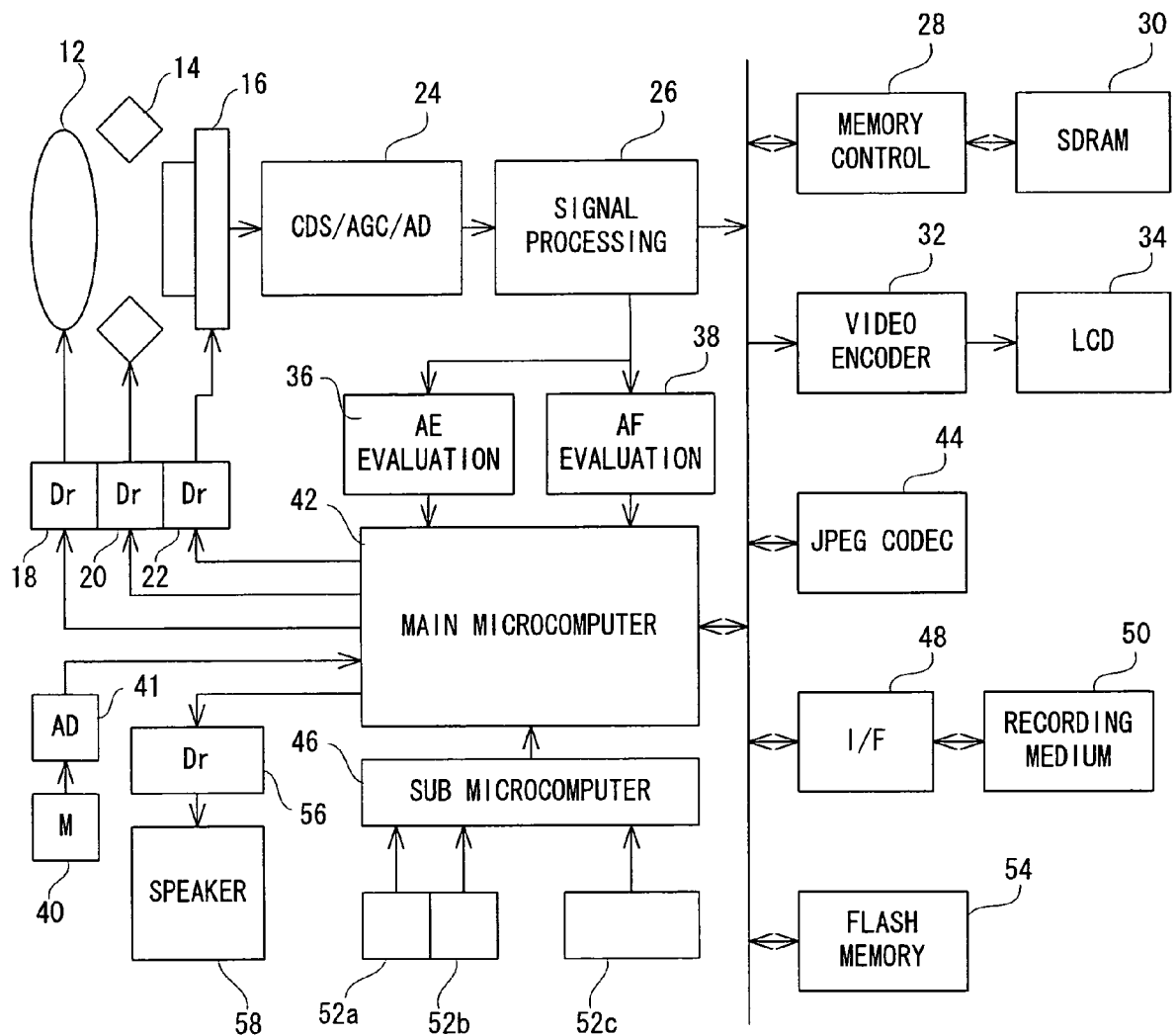
FIG. 3 is a functional block diagram showing second and fifth embodiments of the present invention.

Then, a second embodiment of the present invention will be described below. FIG. 3 is a functional block diagram showing the second embodiment, and the identical components in this figure and FIG. 1 are given the same reference numerals with an omission of a detailed description on them. As compared with the first embodiment, the second embodiment further comprises a driver circuit 56 and a speaker 58 that are controlled by the main microcomputer 42 and generate an operating sound. The operation in the normal photographing mode is the same as with the first embodiment.

Figure 4:
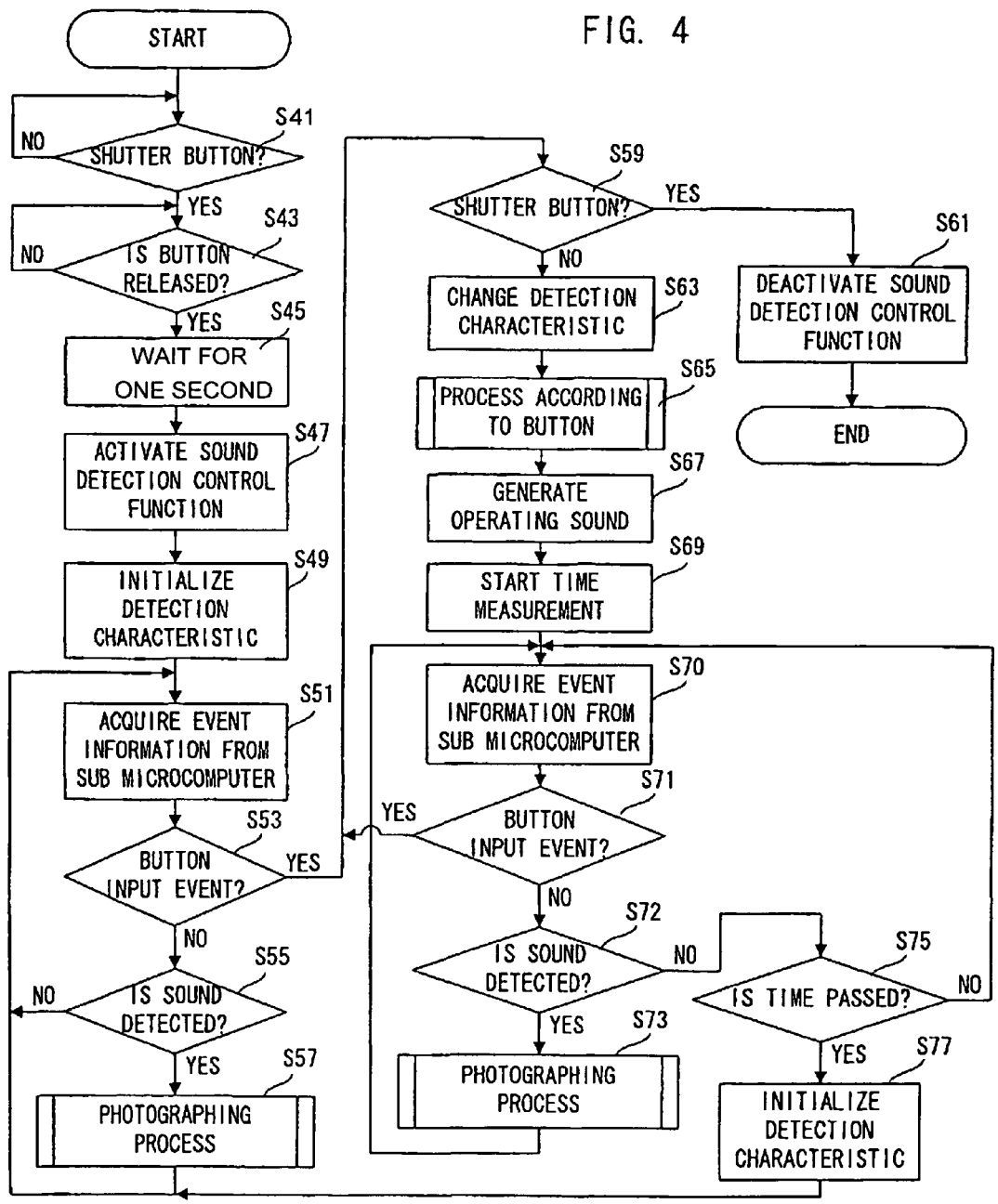
FIG. 4 is a flowchart showing a part of operation of the second embodiment of the present invention.

In the second embodiment, when the sound control mode setting button 52*b* is operated and the digital still camera 102 is set in the sound control mode, the main microcomputer 42 executes a process according to a flowchart in FIG. 4. The control program in the normal photographing mode and the control program corresponding to the flowchart are stored in the flash memory 54.

The operation of the main microcomputer 42 is described with reference to FIG. 4. When the sound control mode setting button 52*b* is operated and the digital still camera 102 is set in the sound control mode, it is detected on the basis of information from the sub microcomputer 46 that the shutter button 52*a* is firstly pressed and then the button is released (S41, S43). When the release of the button is detected, after a waiting time of one second, the sound detection function of the main microcomputer 42 is activated to start the detection of a sound input from the microphone 40 (S45, S47). The reason for waiting one second in the step S45 is the same as the reason for carrying out the step S5 in FIG. 2 showing the operation of the first embodiment.

After the sound detection function of the main microcomputer 42 is activated in the step S47, a detection characteristic of the sound detection function is initialized (S49). By the initialization of the detection characteristic, the sound detection function makes it possible to detect the output of the microphone 40 without a high-frequency cut off characteristic. Then, event information is acquired from the sub microcomputer 46 (S51), and it is detected whether or not there is a button input event indicating the operation of a button (S53). If it is detected that there is no button input event, it is detected whether or not the sound input from the microphone 40 is a sound at a predetermined or higher level (S55). The sound detection in the step S55 is not limited to human voice and applies to any sounds capable of being detected by the microphone 40 such as a note of a flute and a clap of hands, as with the step S11 of FIG. 2 showing the operation of the first embodiment.

If a sound at a predetermined or higher level is detected in the step S55, a photographing process is carried out (S57) and the process is returned to an earlier stage of step S51. If no sound at a predetermined or higher level is detected in the step S55, the process is returned to the earlier stage of step S55 without the execution of photographing process. In this embodiment, unlike the first embodiment, the sound control mode is not terminated even after the execution of the photographing process. Besides, the photographing process in the step S57 indicates a combination of preprocessing of image recording process and the image recording process in the normal photographing mode.

On the other hand, when it is detected in the step S53 that there is a button input event, if the event is generated by operation of the shutter button 52a, the sound detection function of the main microcomputer 42 is deactivated and the sound control mode is terminated (S59, S61). If it is detected in the step S59 that the button input event is not generated by operation of the shutter button 52a, a detection characteristic of the sound detection function of the main microcomputer 42 is changed (S63). With a change in the detection characteristic, the sound detection function is performed to detect a sound through the use of a signal from which a high-frequency component, as a main component of an operating sound generated from the speaker 58 according to output of the microphone 40, is cut off. Then, a process is carried out according to the button input event detected in the step S53 (S65), the driver circuit 56 is instructed to produce an operating sound, and then the operating sound is emitted from the speaker 58 (S67).

Then, a counter in the main microcomputer 42 is activated to start time measurement (S69), event information is acquired from the sub microcomputer (S70), and it is detected whether or not there is any button input event indicating operation of a button (S71). If it is detected that there is no button input event, it is detected whether or not the sound that is input from the microphone 40 and from which the high-frequency component is cut off is a sound at a predetermined or higher level (S72).

If the sound meeting those requirements is detected in the step S72, the photographing process is carried out as in the step S57 (S73), and the process is returned to an earlier stage of step S70. Operating sound generated in the operating sound generation circuit 56 is a high-frequency sound and its detection characteristic is changed in such a manner that the sound detection function of the main microcomputer 42 is performed to detect a sound using a signal from which a high-frequency component is cut off, thereby preventing the sound control function from being activated by the operating sound emitted from the speaker 58.

On the other hand, if no sound meeting those requirements is detected in the step S72, it is detected whether a predetermined time has been passed or not by the time measurement started in the step S69 (S75), and if the passage of the time is detected, the detection characteristic of the sound detection function is initialized (S77), and the process is returned to the earlier stage of step S51. With the initialization of the detection characteristic, the sound detection function is performed to detect the output of the microphone 40 without a high-frequency cut off characteristic. If no passage of the time is detected in the step S75, the process is returned to the earlier stage of step S70.

Besides, the predetermined time here is set according to a duration of the operating sound generated in the step S67.

In the second embodiment, the use of an operating button is detected and the sound detection characteristic is changed for a predetermined time, which avoids a malfunction resulting from the sound generated by use of the operating button. In the second embodiment, the step S67 of generating an operating sound may be omitted, the detection characteristic in the step S63 may be changed so as to cut off a mechanical sound generated by press of an operating button, and a predetermined time detected in the step S75 may be a time between the instant when an operating button was pressed and the instant when a sound generated by the press of the button has exerted no effect, and the shape of an operating button and the attachment position of the microphone 40, etc. may be set as appropriate in accordance with the structural features of the digital still camera 102.

Figure 5:
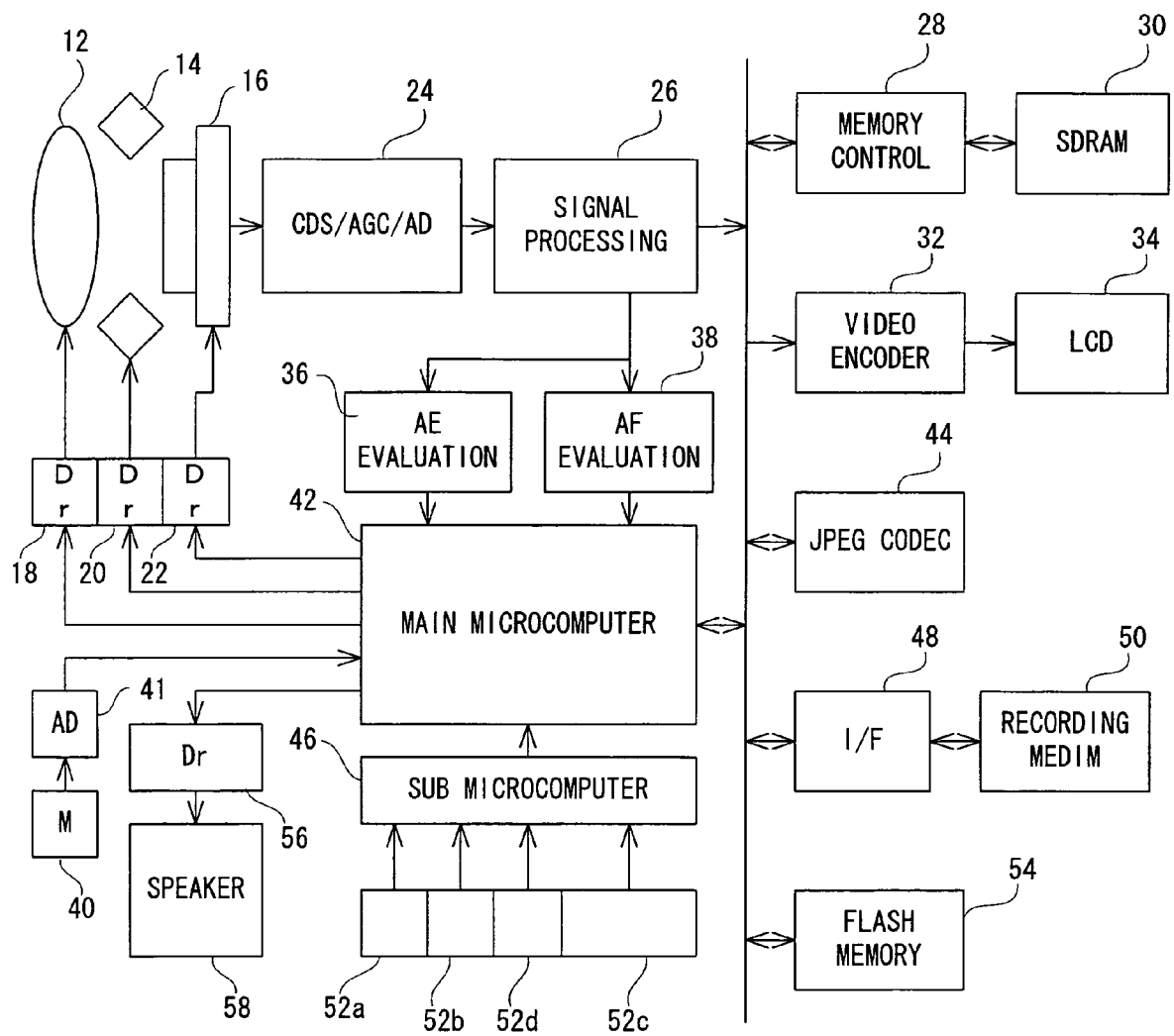
FIG. 5 is a functional block diagram showing third and fourth embodiments of the present invention.

Next, a third embodiment of the present invention is described below. FIG. 5 is a functional block diagram showing the third embodiment, and identical components in this figure and FIG. 3 indicating the second embodiment are given the same reference numerals with an omission of a detailed description on them. As compared with the second embodiment, the third embodiment further comprises an operating sound setting button 52d that is connected to the sub microcomputer 46 and used to instruct the main microcomputer 42 to set or cancel an operating sound generation mode in which an operating sound is generated from the driver circuit 56 and the speaker 58. The operation in the normal photographing mode is the same as that in the first embodiment.

Figure 6:
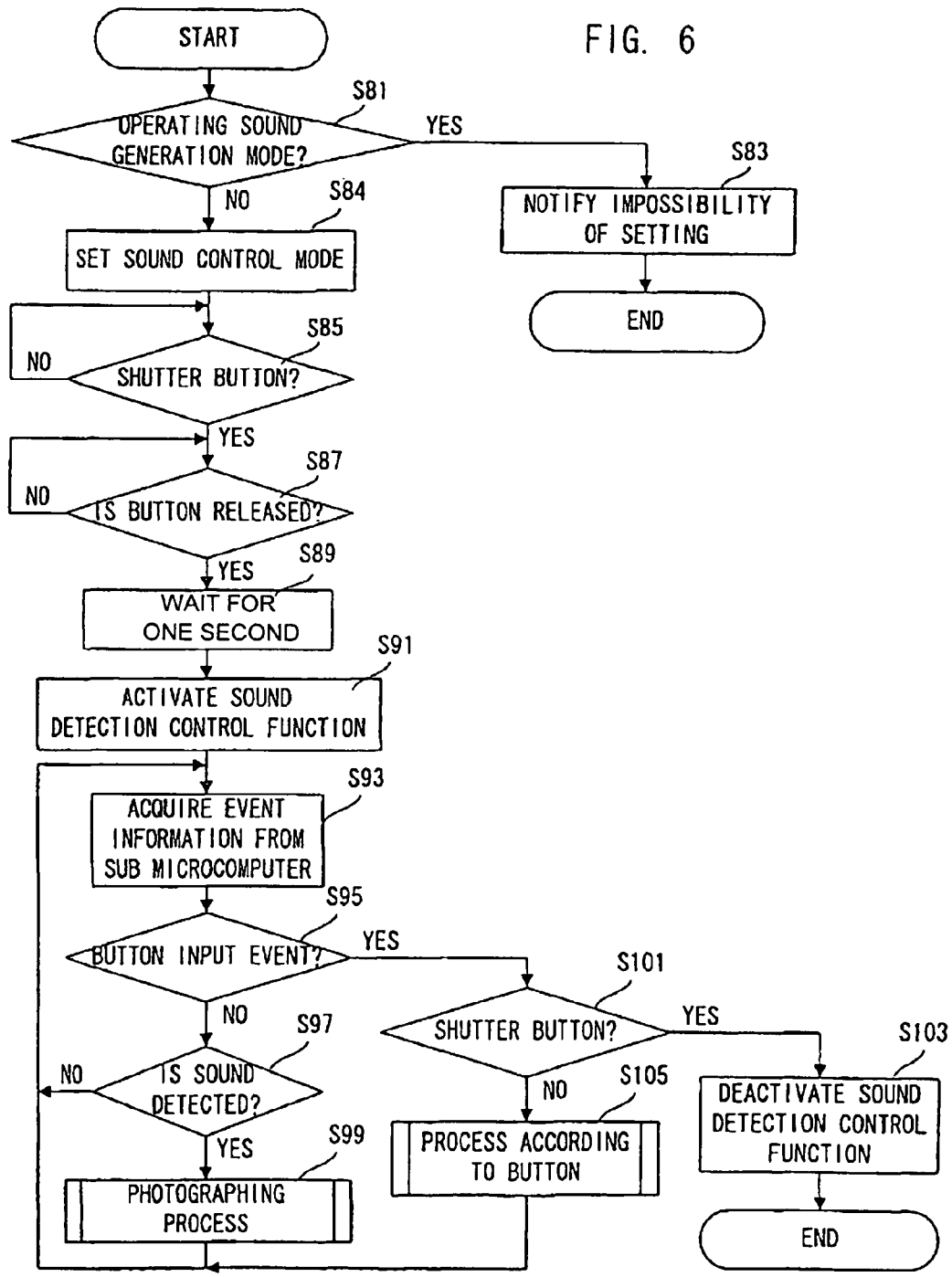
FIG. 6 is a flowchart showing a part of operation of the third embodiment of the present invention.

In the third embodiment, when the sound control mode setting button 52b is operated, the main microcomputer 42 executes a process according to a flowchart in FIG. 6. Besides, the control program in the normal photographing mode and the control program corresponding to the flowchart are stored in the flash memory 54.

The operation of the main microcomputer 42 is described below with reference to FIG. 6. When the sound control mode setting button 52b is operated, it is firstly detected whether or not the digital still camera 103 is set in the operating sound generation mode by operation of the operating sound setting button 52d (S81), and if it is set so, a sound from the speaker 58 and display on the LCD monitor 34 notify that it is impossible to set the sound control mode for execution of sound control (S83), and then the process is terminated. If the digital still camera 103 is set in the operating sound generation mode, when the shutter button 52a or the operating button group 52c is operated, the main microcomputer 42 uses the driver circuit 56 and the speaker 58 to generate an operating sound. If it is not set so, no operating sound is generated from the driver circuit 56 and the speaker 58.

If it is detected in the step S81 that the camera is not set in the operating sound generation mode, the camera is set in the sound control mode (S84), and it is detected on the basis of information from the sub microcomputer 46 that the shutter button 52a is pressed and then released (S85, S87). When the release of the button is detected, after a waiting time of one second, the sound detection function of the main microcomputer 42 is activated and the detection of a sound input from the microphone 40 is started (S89, S91). The reason for waiting one second in the step S89 is the same as the reason for executing the step S5 of FIG. 2 which indicates the operation of the first embodiment.

Then, event information is acquired from the sub microcomputer 46 (S93), and it is detected whether or not there is a button input event indicating the operation of a button (S95). If it is detected that there is no button input event, it is detected whether or not the sound input from the microphone 40 is a sound at a predetermined or higher level (S55). The sound detection in the step S97 is not limited to human voice, and applies to any sounds capable of being detected by the microphone 40 such as a note of a flute and a clap of hands, as in the step S11 of FIG. 2 indicating the operation of the first embodiment.

If a sound at a predetermined or higher level is detected in the step S97, the photographing process is carried out (S99), and the process is returned to an earlier stage of step S93. If no sound at a predetermined or higher level is detected in the step S97, the process is returned to the earlier stage of the step S93 without execution of the photographing process. In this embodiment, the sound control mode is not terminated even after the execution of the photographing process, as with the second embodiment. Besides, the photographing process in the step S99 indicates a combination of the preprocessing of image recording process and the image recording process in the normal photographing mode.

On the other hand, when it is detected in the step S95 that there is a button input event, if the event is generated by operation of the shutter button 52a, the sound detection function of the main microcomputer 42 is deactivated and the sound control mode is terminated (S101, S103). If it is detected in the step S101 that the button input event is not generated by operation of the shutter button 52a, a process is carried out according to the button input event detected in the step S95 (S105), and the process is returned to the earlier stage of step S93.

In the third embodiment, when it is detected that the operating sound generation mode is set, the use of the sound detection function is prohibited, thereby avoiding a malfunction due to an operating sound resulting from the use of an operating button.

Next, a fourth embodiment of the present invention is described below. A functional block diagram indicating the fourth embodiment is the same as the functional block diagram indicating the third embodiment in FIG. 5, and thus a detailed description is omitted here. The operation in the normal photographing mode is the same as that of the first embodiment.

Figure 7:
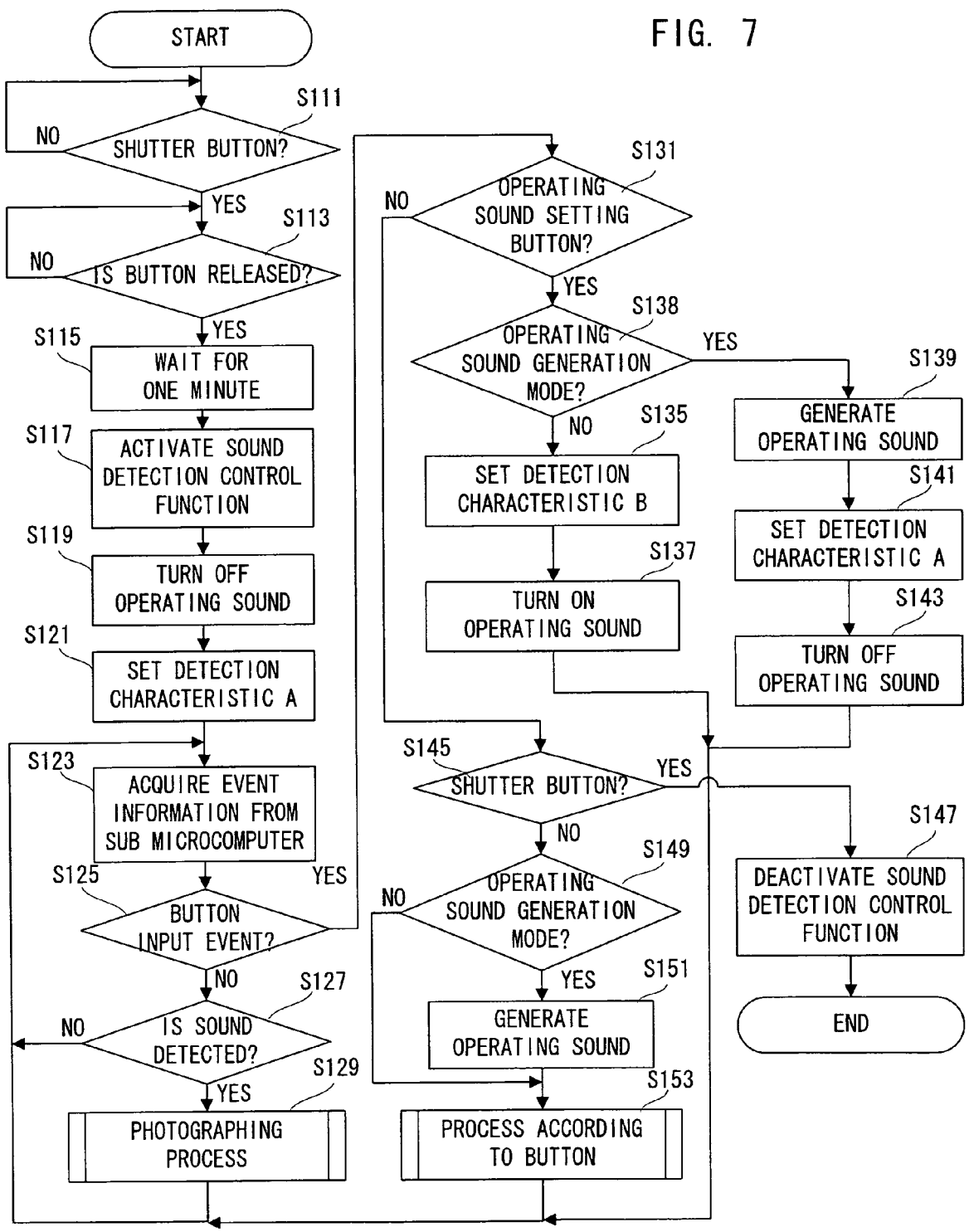
FIG. 7 is a flowchart showing a part of operation of the fourth embodiment of the present invention.

In the fourth embodiment, when the sound control mode setting button 52b is operated and the digital still camera 103 is set in the sound control mode, the main microcomputer 42 executes a process according to a flowchart in FIG. 7. Besides, the control program in the normal photographing mode and the control program corresponding to the flowchart are stored in the flash memory 54.

The operation of the main microcomputer 42 is described below with reference to FIG. 7. When the sound control mode setting button 52b is operated and the digital still camera 103 is set in the sound control mode, it is detected on the basis of information from the sub microcomputer 46 that the shutter button 52a is firstly pressed and then the button is released (S111, S113). When the release of the button is detected, after a waiting time of one second, the sound detection function of the main microcomputer 42 is activated to start the detection of a sound input from the microphone 40 (S115, S117). The reason for waiting one second in the step S115 is the same as the reason for carrying out the step S5 in FIG. 2 indicating the operation of the first embodiment.

After the sound detection function of the main microcomputer 42 is activated in the step S117, an operating sound off mode is set in which no operating sound is generated by the driver circuit 56 and the speaker 58 (S119), and a detection characteristic A is set to the sound detection function (S121). The detection characteristic A is a characteristic of a frequency that mainly passes through human voice. Setting the detection characteristic A operates the sound detection function of the main microcomputer 42 in such a manner as to mainly detect human voice.

Then, event information is acquired from the sub microcomputer 46 (S123), and it is detected whether or not there is a button input event indicating the operation of a button (S125). If it is detected that there is no input event, it is detected whether or not the sound input from the microphone 40 satisfies the detection characteristic A and is at a predetermined or higher level (S127). The sound detection in the step S127 is mainly intended for human voice due to the detection characteristic A, and also applies in some degree to sounds other than human voice capable of being detected by the microphone 40, such as a note of a flute and a clap of hands.

If a sound satisfying the detection characteristic A at a predetermined or higher level is detected in the step S127, the photographing process is carried out (S129) and the process is returned to an earlier stage of step S123. If no sound fulfilling those requirements is detected in the step S127, the process is returned to the earlier stage of the step S123 without execution of the photographing process. In this embodiment, unlike the first embodiment, the sound control mode is not terminated even after the execution of the photographing process. Besides, the photographing process in the step S129 indicates a combination of the preprocessing of image recording process and the image recording process in the normal photographing mode.

When it is detected in the step S125 that there is a button input event, if the event is generated by operation of the operating sound setting button 52d, it is detected whether the operating sound generation mode is set or not (S131, S133). If the operating sound generation mode is not set, a detection characteristic B is set to the sound detection function of the main microcomputer 42 (S135), and the operating sound generation mode is set (S137), and then the process is returned to the earlier stage of step S123. If it is detected in the step S133 that the operating sound generation mode is set, an operating sound is generated (S139), the detection characteristic A is set to the sound detection function of the main microcomputer 42 (S141), the operating sound off mode is set (S143), and then the process is returned to the earlier stage of step S123.

The detection characteristic B is a frequency characteristic for cutting off a high-frequency component as a main component of an operating sound emitted from the speaker 58. By setting the detection characteristic B, the sound detection function of the main microcomputer 42 is performed so as not to detect an operating sound emitted from the speaker 58.

On the other hand, if it is detected in the step S125 that there is a button input event and the event is generated by the operation of the shutter button 52a, not by the operation of the operating sound setting button 52d, the sound detection function of the main microcomputer 42 is deactivated and the sound control mode is terminated (S131, S145, S147).

When it is detected in the step S145 that the button input event is not generated by the operation of the shutter button 52a, if the operating sound generation mode is set, an operating sound is generated (S149, S151). If the operating sound generation mode is not set, no operating sound is generated and a process according to the button input event detected in the step S125 is carried out (S153), and then the process is returned to the early stage of step S123.

In the fourth embodiment, when the operating sound generation mode is set, the operating sound generation mode is forcefully canceled or the sound detection characteristic is changed depending upon a setting of the operating sound generation mode, which avoids a malfunction resulting from a sound generated by use of an operating button. Besides, it is also possible to prevent a malfunction resulting from a sound generated by use of an operating button, by not only changing the frequency characteristic but also raising the detection level according to the setting of the operating sound generation mode or tightening up a sound recognition characteristic according to the setting of the same.

Next, a fifth embodiment of the present invention is described below. A functional block diagram indicating the fifth embodiment is the same as the functional block diagram indicating the second embodiment in FIG. 3, and thus a detailed description is omitted here. The operation in the normal photographing mode is the same as that of the first embodiment.

Figure 8:
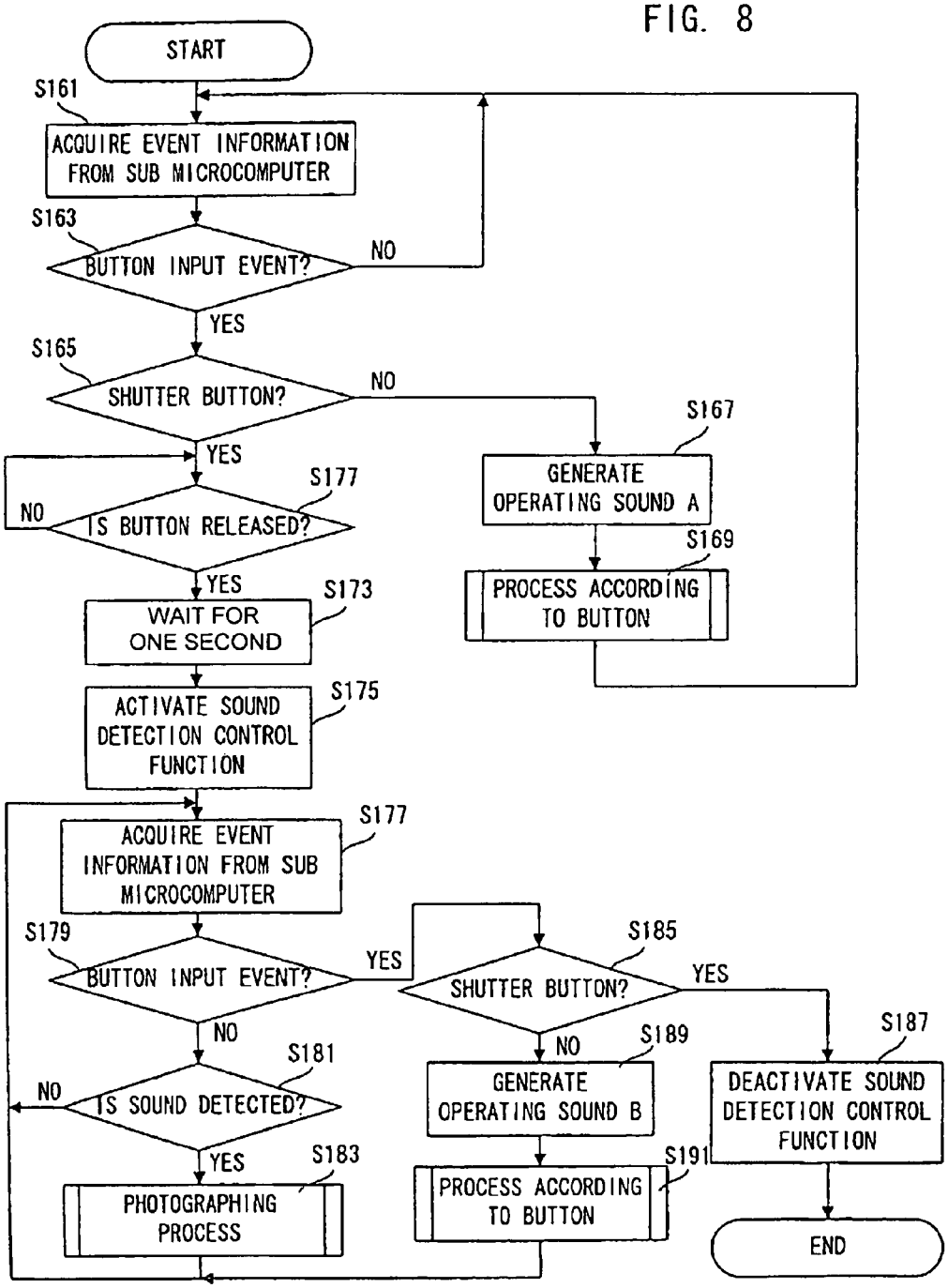
FIG. 8 is a flowchart showing a part of operation of the fifth embodiment of the present invention.

In the fifth embodiment, when the sound control mode setting button 52b is operated and the digital still camera 103 is set in the sound control mode, the main microcomputer 42 executes a process according to a flowchart in FIG. 8. Besides, the control program in the normal photographing mode and the control program corresponding to the flowchart are stored in the flash memory 54.

The operation of the main microcomputer 42 is described below with reference to FIG. 8. When the sound control mode setting button 52b is operated and the digital still camera 103 is set in the sound control mode, event information is acquired from the sub microcomputer (S161), and it is detected whether there is a button input event or not (S163). When it is detected that there is a button input event, an operating sound A is generated if the event is not generated by operation of the shutter button 52a (S167), a process according to the button input event detected in the step S163 is carried out (S169), and then the process is returned to an earlier stage of step S161. Even if it is not detected in the step S163 that there is any button input event, the process is also returned to the earlier stage of step S161. The operating sound A may be any sound of a frequency within an audibility range, and may be an artificial-voice guide.

On the other hand, if it is detected in the S163 that there is a button input event and the event is generated by operation of the shutter button 52a, the release of the button is detected on the basis of information from the sub microcomputer 46 (S171). When the release of the button is detected, after a waiting time of one second, the sound detection function of the main microcomputer 42 is activated and the detection of a sound input from the microphone 40 is started (S173, S175). The reason for waiting one second in the step S173 is the same as the reason for carrying out the step S5 of FIG. 2 indicating the operation of the first embodiment.

Then, event information is acquired from the sub microcomputer 46 (S177), and it is detected whether or not there is a button input event indicating the operation of a button (S179). If it is detected that there is no button input event, it is detected whether or not a sound input from the microphone 40 is at a predetermined or higher level after cutting off of a high-frequency component (S181).

If a sound meeting those requirements is detected in the step S181, the photographing process is carried out (S183), and the process is returned to an earlier stage of step S177. If no sound meeting those requirements is detected in the step S181, the process is returned to the earlier stage of step S177 without execution of the photographing process. In this embodiment, as with the second embodiment, the sound control mode is not terminated even after the execution of the photographing process. Besides, the photographing process in the step S183 indicates a combination of the preprocessing of image recording process and the image recording process in the normal photographing mode.

On the other hand, when it is detected in the step S179 that there is a button input event, if the event is generated by operation of the shutter button 52a, the sound detection function of the main microcomputer 42 is deactivated to terminate the sound control mode (S185, S187). If it is detected in the step S185 that the button input event is not generated by operation of the shutter button 52a, an operating sound B composed of a high-frequency component alone is generated (S189), a process according to the button input event detected in the step S179 is carried out (S191), and then the process is returned to the earlier stage of step S177. Since it is composed of a high-frequency component alone, the operating sound B is excluded from the detection requirement of step S181. Therefore, the sound control function is not performed by the operating sound B.

In the fifth embodiment, changing the operating sound in the sound control mode prevents a malfunction resulting from a sound generated by use of an operating button.

As above, the first to fifth embodiments have been described. Alternatively, the sound detection function of the main microcomputer 42 may be activated just by operating the sound control mode setting button 52b, without having to operate the shutter button 52a. The button required for activating the sound detection function after operation of the sound control mode setting button 52b is not limited to the shutter button 52a. In addition, the sound control is not only limited to the start of a photographing operation but also may apply to a plurality of operations according to a plurality of sounds by use of a sound recognition means. Furthermore, the present invention can be implemented as not only a digital still camera but also any sound-controlled electronic apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic apparatus, comprising:
    a sensor unit for detecting a sound;
    a first processor unit for detecting a key operation;
    a first controller unit for executing a process corresponding to an output from an analog-to-digital conversion circuit, said analog-to-digital conversion circuit receiving input from said sensor unit;
    a second controller unit for executing a process corresponding to an output from said first processor unit; and
    a second processor unit for deactivating said first controller unit from executing the process corresponding to the output of the sensor unit for a predetermined period of time from said key operation based on the output from said first processor unit, said predetermined period of time is a time for detecting the key operation,
    wherein said time for detecting the key operation is the time between when a key is operated and when the key is non-operated.

2. An electronic apparatus according to claim 1, further comprising a sound effect output unit for outputting a sound effect in response to said key operation.

3. An electronic apparatus according to claim 1, wherein said second processor unit includes a characteristic change unit for changing a detection characteristic of said sensor unit.

4. An electronic apparatus according to claim 3, wherein said sensor unit includes a capture unit for capturing a sound and an extraction unit for extracting a predetermined frequency component of the sound captured by said capture unit, and said characteristic change unit changes a frequency characteristic of said extraction unit.

5. An electronic apparatus, comprising:
a sensor unit for detecting a sound;
a first processor unit for detecting a key operation;
a first controller unit for executing a process corresponding to an output from said sensor unit;
a second controller unit for executing a process corresponding to an output from said first processor unit;
a sound effect output unit for outputting a sound effect in response to said key operation;
a second processor unit for changing a setting state of said sound effect output unit between an active state and an inactive state; and
a third processor unit for changing a detection characteristic of said sensor unit according to the setting state of said sound effect output unit,
wherein in said active state when said key operation is detected, said detection characteristic is changed so that the sensor unit detects the sound from which a predetermined frequency component is cut off thereby preventing the sensor from being activated by the sound effect emitted from said sound effect output unit.

6. An electronic apparatus according to claim 5, wherein said sensor unit includes a capture unit for capturing a sound and an extraction unit for extracting a predetermined frequency component of the sound captured by said capture unit, and said third processor unit changes a frequency characteristic of said extraction unit.

7. An electronic apparatus, comprising:
a sensor unit for detecting a sound;
a first processor unit for detecting a key operation;
a first controller unit for executing a process corresponding to an output from said sensor unit;
a second controller unit for executing a process corresponding to an output from said first processor unit;
a sound effect output unit for outputting a sound effect in response to said key operation;
a second processor unit for changing a setting state of said first controller unit between an active state and an inactive state; and
a third processor unit for changing an output characteristic of said sound effect output unit according to the setting state of said first controller unit
wherein in said active state when said key operation is detected, said output characteristic is changed so that a predetermined frequency component is cut off from the sound effect emitted by said sound effect output unit thereby preventing the sensor from being activated.

8. An electronic apparatus according to claim 7, wherein said third processor unit changes a frequency characteristic of a sound effect.

* * * * *